A. R. MERRITT.
ADJUSTABLE SAW FILING GUIDE.
APPLICATION FILED MAR. 15, 1916.

1,223,191.

Patented Apr. 17, 1917.
2 SHEETS—SHEET 1.

Witnesses
Paul M. Hunt
T. M. Roberts

Inventor
A. R. Merritt
By John Louis Waters & Co.
Attorney

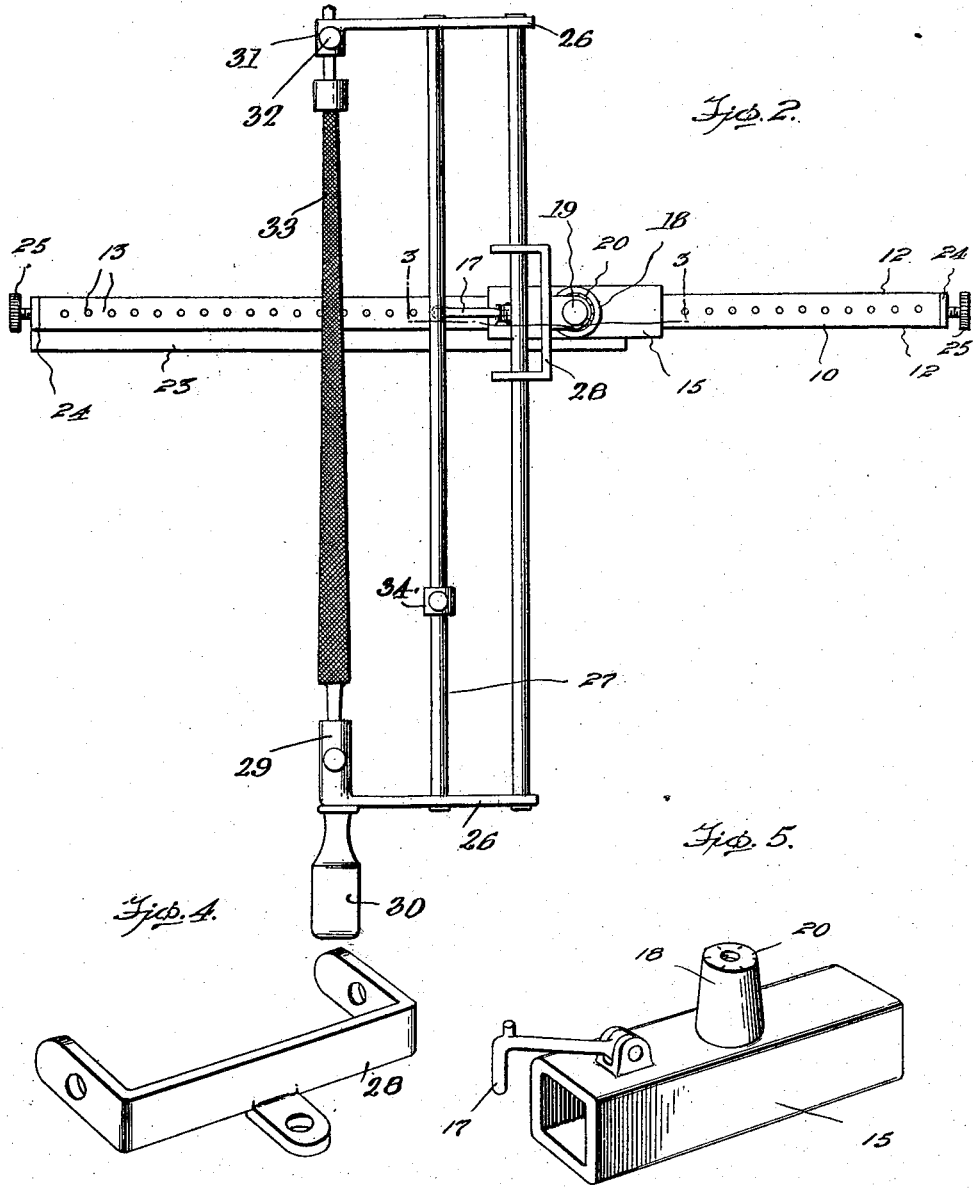

UNITED STATES PATENT OFFICE.

ADELBERT R. MERRITT, OF BREWERTON, NEW YORK.

ADJUSTABLE SAW-FILING GUIDE.

1,223,191.  Specification of Letters Patent.  Patented Apr. 17, 1917.

Application filed March 15, 1916. Serial No. 84,355.

*To all whom it may concern:*

Be it known that I, ADELBERT R. MERRITT, a citizen of the United States, residing at Brewerton, in the county of Onondaga and State of New York, have invented certain useful Improvements in Adjustable Saw-Filing Guides, of which the following is a specification, reference being had therein to the accompanying drawing.

This invention relates to improvements in adjustable saw filing guides, one object of the invention being the provision of a guide by means of which the size, depth and angle of the teeth may be regulated to an exactness, and by means of which a uniform filing may be obtained.

A further object of this invention is the provision of a simple, inexpensive device of this character which may be readily operated by the ordinary mechanic and which is thoroughly efficient and practical in use.

In the accompanying drawings:—

Fig. 2 is a top plan view thereof.

Figs. 4 and 5 are detailed views of parts thereof.

Figure 1:
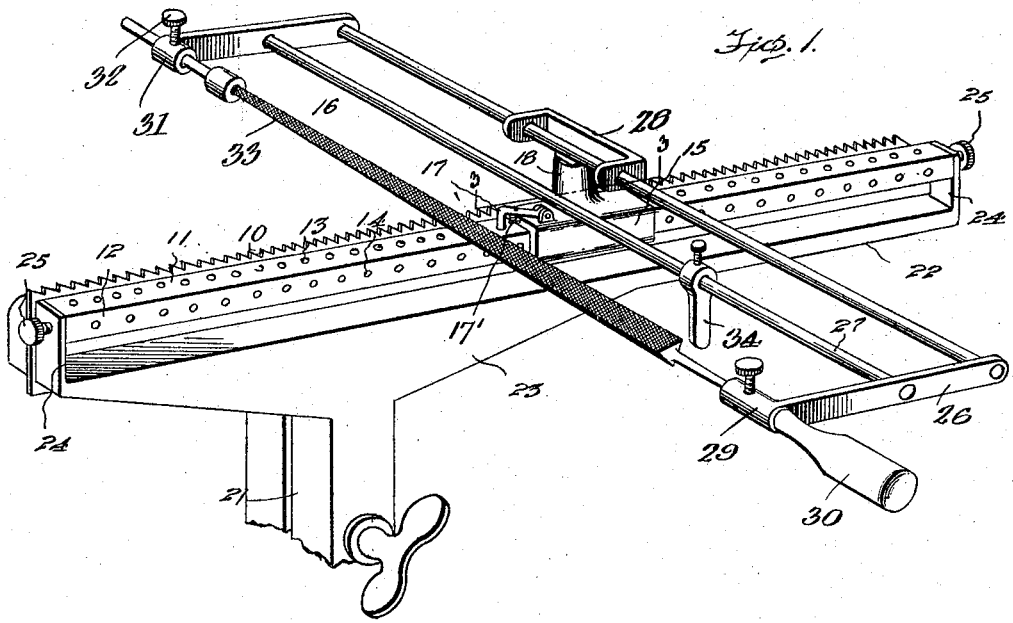
Figure 1 is a perspective view of the complete guide and the position it assumes when in use.
Figure 3:
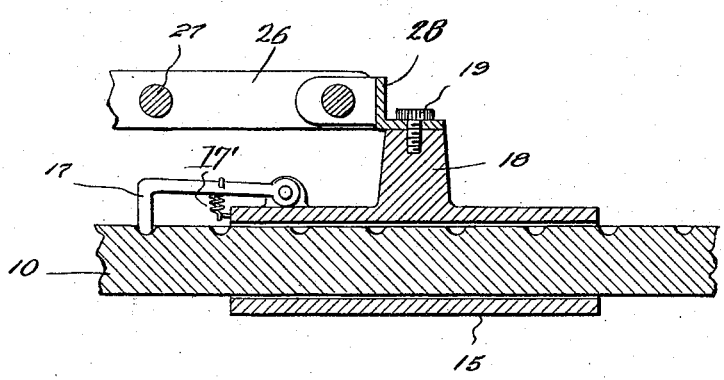
Fig. 3 is a cross section on line 3—3 of Fig. 2.

Referring to the drawings, the numeral 10 designates a bar which is square in cross section and is provided upon the four straight flat faces 11 and 12, with rows of longitudinally spaced holes 13 and 14 respectively. The holes in each row are uniformly spaced but the space between the holes in each row varies. The holes in each row are adapted to correspond with a saw having a certain number of teeth to the inch, for instance, if a saw has six teeth to the inch, then the flat face having a corresponding number of holes, is employed.

Mounted upon the guide for sliding movement is a sleeve 15 which has mounted thereon the filing guide or supporting frame generally designated 16, the said filing guide or frame being disposed to slide at an angle across the bar.

The sleeve 15 has a catch or dog 17 pivotally mounted thereon while a spring 17' serves to positively hold the engaging end of the catch in any of the holes in either of the respective rows one at a time to maintain the sleeve rigid until moved for the next tooth.

Upon the top of the post 18 is mounted a set screw 19 which provides a means for adjusting the filing guide 16 to any angle, relatively to the cutting edge of the saw, an indicator 20 being disposed adjacent this screw so that the angle may be readily determined and the parts set.

The vise 21 is made with an extension 22 on the outside jaw 23, the same having the necessary lip 24 at each end to receive the bar 10, the same being provided with set screws 25 to hold the bar rigidly in place, yet being adjustable to permit of the disengagement of the bar so as to consequently permit of the removal and subsequent adjustment of the sleeve 15 on a different face of the bar.

The filing guide or supporting frame 16, heretofore mentioned, in the present instance consists of end pieces 26 and spaced side rods 27 one of which is swingingly mounted in the arms of a U-shaped hanger 28, adjustably supported on the post 18 by the set screw 19. A file receiving socket 29 is formed on the inner face of the extended portion of one of the end pieces while a handle 30 projects from the opposite surface thereof. Another file receiving socket 31 is adjustably mounted in the extended portion of the other end piece by means of a set screw 32 and coöperates with the socket 29 in supporting the file 33.

A stop finger 34 is supported for adjustment on the rod 27 of the filing guide and when set by the user limits the movement of the guide in one direction, the finger 34 being preferably positioned at one end of the file 33 so as to avoid movement of the guide or frame beyond this end of the file which would cause the disengagement of the file from the tooth of the saw. In other words, the finger 34 forms an abutment to coact with the vise to limit the throw in one direction of the guide in the operation thereof.

From the foregoing description taken in connection with the drawings, it is evident that with an adjustable saw filing guide, made according to and embodying the present invention, and as each face of the bar 12 is provided with one set of holes for the reception of the lock catch, and as two bars constitute a complete apparatus, an exceedingly practical and efficient device is provided.

What I claim as new is:—

1. An adjustable saw filing device comprising a support, a bar carried in the support and having a plurality of rows of spaced holes, a sleeve slidable over the bar and having a bearing rising therefrom, a U-shaped hanger mounted on the bearing for swinging movement, a set screw connecting the hanger to the bearing for locking it in adjusted position, a catch pivoted on the sleeve and engageable in any one of the holes for locking the sleeve adjusted, a guide having spaced parallel longitudinal rods, one rod being slidably and swingingly engaged in the hanger, means on the guide for clamping a file therein and permitting adjustment of the same, and resilient means acting upon the catch to hold the same in positive locking position.

2. An adjustable saw filing device comprising a support, a bar carried in the support and having a plurality of rows of spaced holes, a sleeve slidable over the bar and having a bearing rising therefrom, a U-shaped hanger mounted on the bearing for swinging movement, a set screw connecting the hanger to the bearing for locking it in adjusted position, a catch pivoted on the sleeve and engageable in any one of the holes for locking the sleeve adjusted, a guide having spaced parallel longitudinal rods, one rod being slidably and swingingly engaged in the hanger, means on the guide for clamping a file therein and permitting adjustment of the same, resilient means acting upon the catch to hold the same in positive locking position, and a stop adjustably mounted on the other rod.

In testimony whereof I affix my signature.

ADELBERT R. MERRITT.

Copies of this patent may be obtained for five cents each, by addressing the "Commissioner of Patents, Washington, D. C."